United States Patent
Muff et al.

(10) Patent No.: US 8,239,438 B2
(45) Date of Patent: Aug. 7, 2012

(54) METHOD AND APPARATUS FOR IMPLEMENTING A MULTIPLE OPERAND VECTOR FLOATING POINT SUMMATION TO SCALAR FUNCTION

(75) Inventors: Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 11/840,277

(22) Filed: Aug. 17, 2007

(65) Prior Publication Data
US 2009/0049113 A1    Feb. 19, 2009

(51) Int. Cl.
G06F 7/38 (2006.01)
(52) U.S. Cl. .......................... 708/490; 708/510; 708/505
(58) Field of Classification Search .................. 708/620, 708/650, 490
See application file for complete search history.

(56) References Cited

U.S. PATENT DOCUMENTS

| | | | | |
|---|---|---|---|---|
| 3,299,261 | A * | 1/1967 | Steigerwalt, Jr. | 708/709 |
| 5,226,171 | A * | 7/1993 | Hall et al. | 712/9 |
| 5,375,078 | A * | 12/1994 | Hrusecky et al. | 708/501 |
| 6,922,716 | B2 * | 7/2005 | Desai et al. | 708/524 |
| 6,996,596 | B1 * | 2/2006 | Ho et al. | 708/495 |
| 7,475,222 | B2 * | 1/2009 | Glossner et al. | 712/7 |
| 2006/0041610 | A1 * | 2/2006 | Hokenek et al. | 708/620 |
| 2006/0253519 | A1 * | 11/2006 | Tran | 708/523 |
| 2008/0114826 | A1 | 5/2008 | Mejdrich et al. | |
| 2009/0158013 | A1 | 6/2009 | Muff et al. | |

* cited by examiner

*Primary Examiner* — Chat Do
*Assistant Examiner* — Kevin G Hughes
(74) *Attorney, Agent, or Firm* — Patterson & Sheridan, LLP

(57) ABSTRACT

Embodiments of the invention provide methods and apparatus for executing a multiple operand instruction. Executing the multiple operand instruction comprises computing an arithmetic result of a pair of operands in each processing lane of a vector unit. The arithmetic results generated in each processing lane of the vector unit may be transferred to a dot product unit. The dot product unit may compute an arithmetic result using the arithmetic result computed by each processing lane of the vector unit to generate an arithmetic result of more than two operands.

23 Claims, 8 Drawing Sheets

601 — fadd $T_1$, A, B
602 — fadd $T_2$, C, D
603 — fadd $T_3$, E, F
604 — fadd $T_4$, G, H
605 — fadd $T_5$, $T_1$, $T_2$
606 — fadd $T_6$, $T_3$, $T_4$
607 — fadd $T_7$, $T_5$, $T_6$ 701 — lux 128 $T_1$, GPR1, GPR2 → $T_1$ | A | B | C | D |
702 — lux 128 $T_2$, GPR1, GPR3 → $T_2$ | E | F | G | H |
703 — Vaddfp 128 $T_A$, $T_1$, $T_2$, → $T_A$ | A+E | B+F | C+G | D+H |
704 — Vdot4fp 128 $T_B$, $T_A$, $T_{one}$, → $T_A$

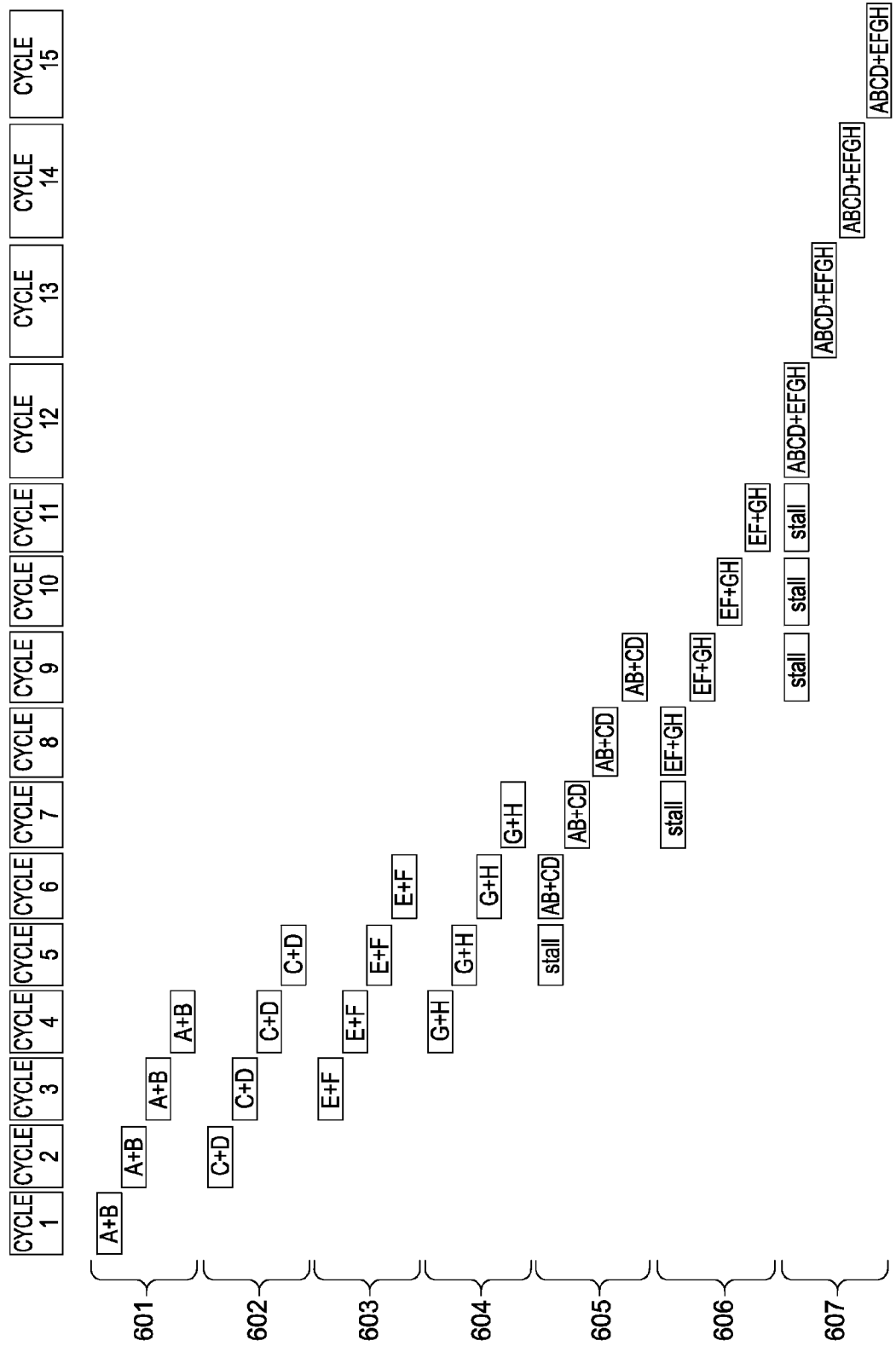

METHOD AND APPARATUS FOR IMPLEMENTING A MULTIPLE OPERAND VECTOR FLOATING POINT SUMMATION TO SCALAR FUNCTION

BACKGROUND OF THE INVENTION

1. Field of the Invention

The present invention generally relates to data processing, and more specifically to an instruction set for obtaining an arithmetic result of more than two operands.

2. Description of the Related Art

Computer software applications generally include a set of instructions for manipulating and processing data. Manipulating and processing data may involve performing one or more arithmetic operations on the data such as, for example, adding one or more numbers to obtain a sum of the numbers. Modern computer systems generally include scalar units, vector units, or shared vector/scalar units that are capable of performing operations on data. A scalar unit may perform scalar operations such as, for example, addition, subtraction, division, multiplication, and the like. A vector unit may perform vector operations such as, for example, dot product and cross product operations. Each of the scalar and vector units may receive one or more operands as an input. The scalar and vector units may process the operands to generate a desired result.

One problem with the prior art is that existing scalar and vector units can produce a sum of only two operands at a time. Therefore, to obtain a sum of more than two operands, multiple add instructions must be issued. For example, a spread sheet application may include a column containing more than two numbers. If a sum of all the numbers in the column is desired, the spread sheet application must issue multiple add instructions, wherein each add instruction computes a sum of a pair of operands.

Such methods of computing a sum by issuing multiple two-operand add instructions are inefficient because it can result in multiple stall cycles in a processor computing the sum. As an illustration, computing a sum of more than two operands may involve issuing a first instruction to add a first operand and a second operand, wherein the first instruction generates a first sum. A second instruction subsequent to the first instruction may add the first sum to a third operand to obtain a second sum. Because the second instruction is dependent on the first instruction, execution of the second instructions may be stalled for one or more clock cycles to obtain the first sum. Such stalling can be particularly problematic when a sum of a large number of operands is desired because performance of the system may be adversely affected by a proportionately large number of stall cycles.

Furthermore, if only two operands can be added at a time, the sum of each pair of operand must be stored in temporary registers to make the sum available to subsequent instructions. When large numbers of operands are to be added, a large number of temporary registers may be necessary to store the sum of each pair of operands. Such excessive use of registers further increases the inefficiency of the system and makes valuable temporary registers unavailable for other purposes.

Accordingly, what is needed are improved methods and systems for computing a sum of more than two operands.

SUMMARY OF THE INVENTION

The present invention generally relates to data processing, and more specifically to an instruction set for obtaining an arithmetic result of more than two operands.

One embodiment of the invention provides a method for computing an arithmetic result of more than two operands. The method generally comprises computing a first arithmetic result of a pair of operands in each of one or more of a plurality of processing lanes of a vector unit in response to receiving a multiple operand instruction and transferring the first arithmetic result of each pair of operands from the one or more processing lanes of the vector unit to a dot product unit. The method further comprises computing a second arithmetic result, the second arithmetic result being an arithmetic result of each first arithmetic result received from the one or more processing lanes, to generate the arithmetic result of more than two operands.

Another embodiment of the invention provides a method for computing a sum of eight operands. The method generally comprises computing a sum of a pair of operands in each of four processing lanes of a vector unit in response to receiving a multiple addend instruction and transferring the sum of each pair of operands from each processing lane of the vector unit to a dot product unit. The method further comprises adding the sums of each pair of operands in the dot product unit to generate the sum of the eight operands.

Yet another embodiment of the invention provides a system generally comprising a plurality of processors communicably coupled with one another. Each processor generally comprises a register file comprising a plurality of registers, each register comprising a plurality of operands and a vector unit comprising a plurality of vector processing lanes. The vector unit is generally configured to receive a multiple operand instruction specifying at least one register and compute a first arithmetic result of a pair of operands received from the at least one register in each of one or more processing lanes of the vector unit in response to receiving the multiple operand instruction. The processor further comprises a dot product unit configured to receive the first arithmetic result from each of the one or more processing lanes of the vector unit, and compute a second arithmetic result, the second arithmetic result being an arithmetic result of the first arithmetic results received from the one or more processing lanes, to compute an arithmetic result of more than two operands.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6B illustrates an exemplary timing diagram for the instructions in FIG. 6A according to an embodiment of the invention.

DETAILED DESCRIPTION OF THE PREFERRED EMBODIMENTS

Embodiments of the invention provide methods and apparatus for executing a multiple operand instruction. Executing the multiple operand instruction comprises computing an arithmetic result of a pair of operands in each processing lane of a vector unit. The arithmetic results generated in each processing lane of the vector unit may be transferred to a dot product unit. The dot product unit may compute an arithmetic result using the arithmetic result computed by each processing lane of the vector unit to generate an arithmetic result of more than two operands.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Exemplary System

Figure 1:
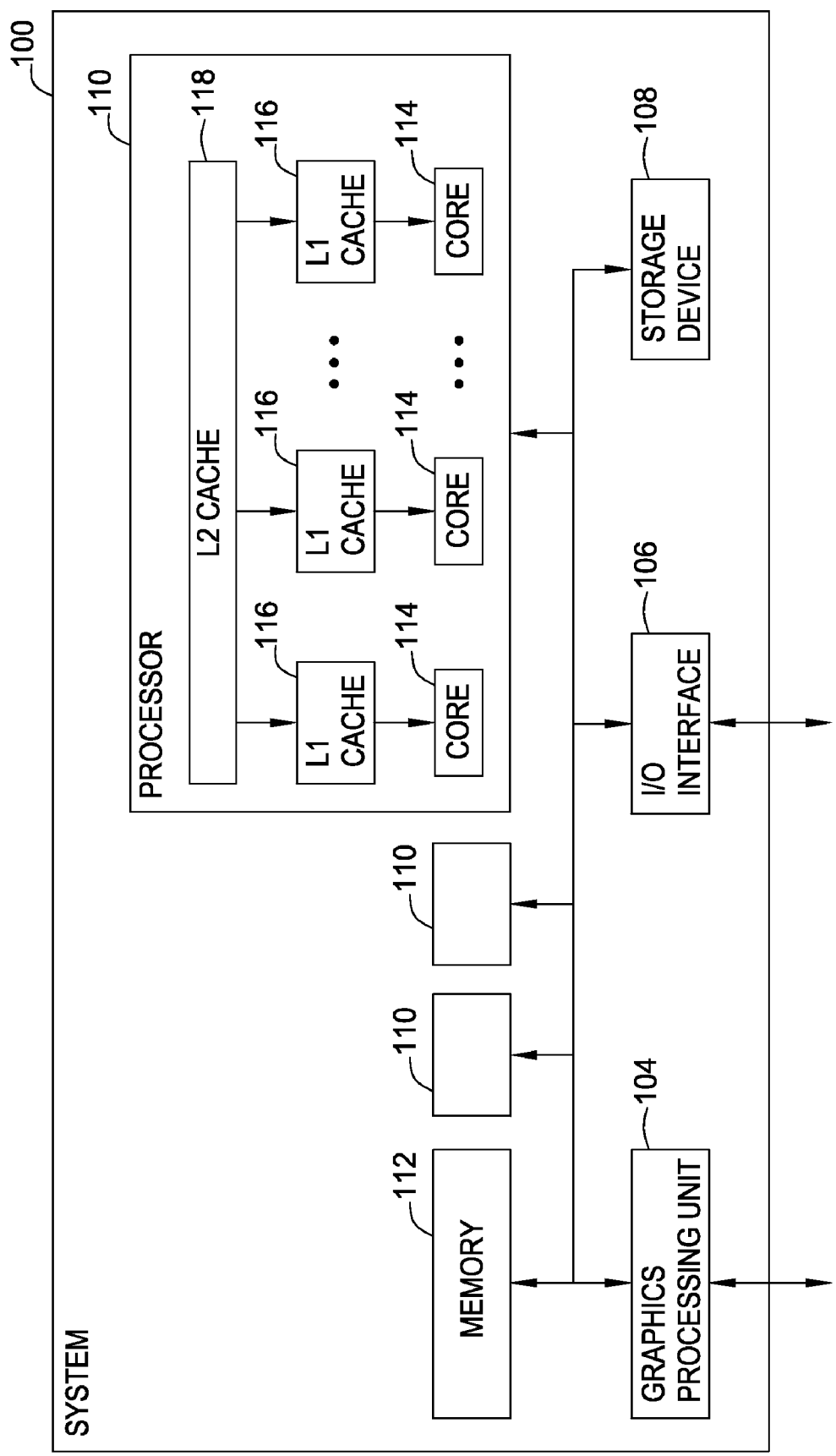
FIG. 1 illustrates an exemplary system according to an embodiment of the invention.

FIG. 1 illustrates an exemplary system 100 according to an embodiment of the invention. As illustrated, system 100 includes a plurality of processors 110, memory 112, graphics processing unit (GPU) 104, input/output (IO) interface 106, and a storage device 108. The memory 112 is preferably a random access memory sufficiently large to hold the necessary programming and data structures operated on by processor 110. While memory 112 is shown as a single entity, it should be understood that memory 112 may in fact comprise a plurality of modules, and that memory 112 may exist at multiple levels, for example, L3 cache, L4 cache, and main memory.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 108 could be part of one virtual address space spanning multiple primary and secondary storage devices.

IO interface 106 may provide an interface between the processors 110 and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 104 may be configured to receive graphics data, for example, 2-Dimensional and 3-Dimensional graphics data, from a processor 110. GPU 104 may perform one or more computations to manipulate the graphics data, and render images on a display screen.

Processor 110 may include a plurality of processor cores 114. Processors cores 114 may be configured to perform pipelined execution of instructions retrieved from memory 112. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 116. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the respective processor core 114.

In one embodiment of the invention, L1 cache 116, and L2 cache 118 may be SRAM based devices. However, one skilled in the art will recognize that L1 cache 116 and L2 cache 118 may be any other type of memory, for example, DRAM. One skilled in the art will also recognize that one or more higher levels of cache, for example, L3 cache and L4 cache may also be included in system 100. Each higher level cache may be associated with one or more caches of the next lower level.

Figure 2:
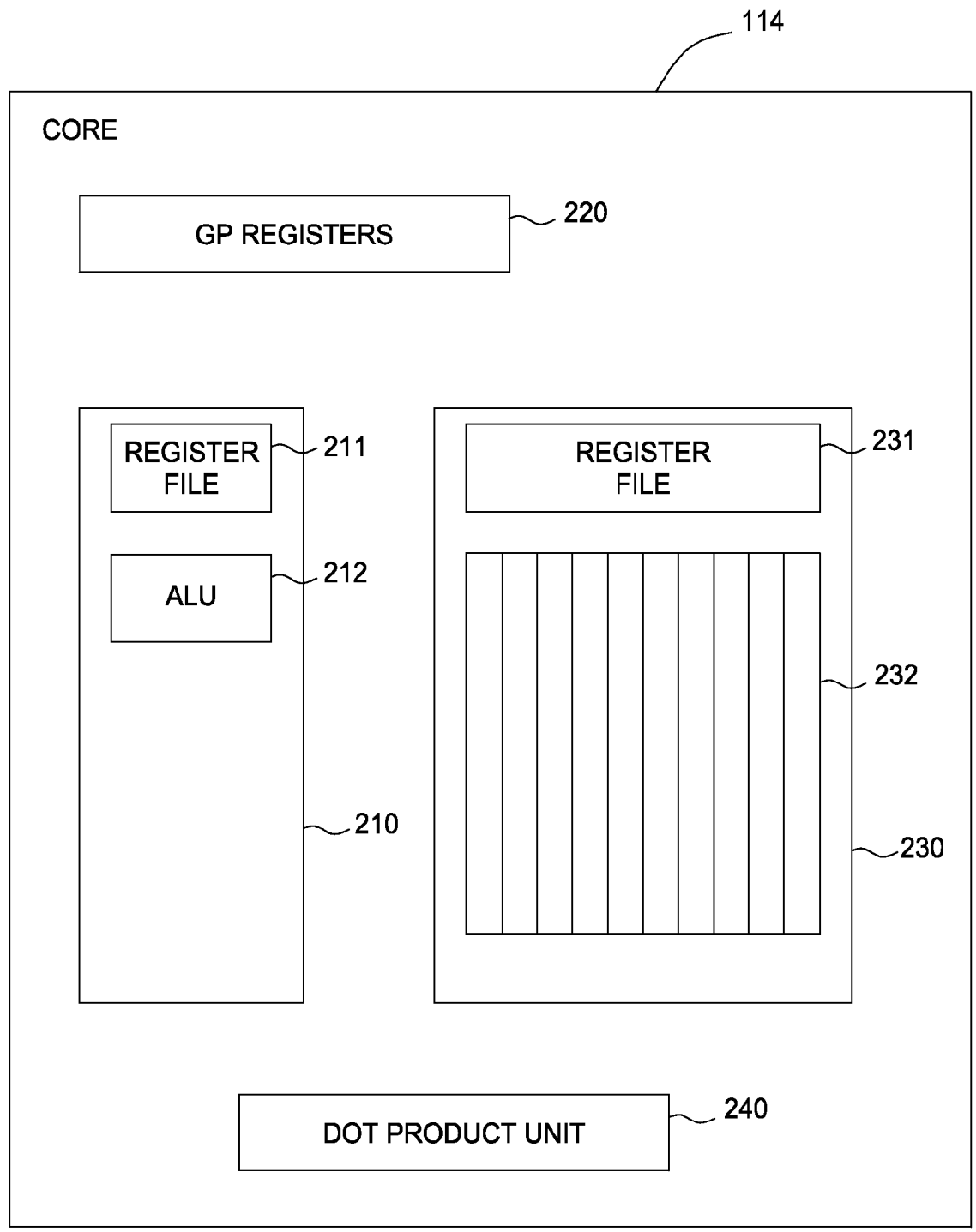
FIG. 2 illustrates an exemplary processor core according to an embodiment of the invention.

FIG. 2 is a more detailed diagram of components of a processor core 114 according to an embodiment of the invention. Processor core 114 may include a set of general purpose (GP) registers 220 for storing data. Processor core 114 may also include one or more processing subunits for performing one or more operations on data in response to receiving an instruction. For example, processor core 114 may include one or more scalar units 210, one or more vector units 230, and/or one or more dot product units 240.

Scalar unit 210 may comprise a register file 211 and an arithmetic and logic unit (ALU) 212. Register file 211 may contain data and addresses that may be manipulated by the scalar unit 210. In one embodiment of the invention, ALU 212 may be configured to operate on a pair of operands to produce a result. Scalar operations may include, for example, arithmetic operations such as addition and subtraction. The result produced by a scalar unit 210 may be stored in the register file 211, register file 231, and/or general purpose registers 230. In one embodiment of the invention, scalar unit 210 may be configured to perform pipelined execution of scalar instructions.

The vector unit 230 may include a set of registers 231, and a set of parallel pipelines 232 for operating on data in registers 231. Pipelines 232 may include one or more arithmetic pipelines configured to perform arithmetic operations, for example, floating point calculations and fixed point calculations. Pipelines 216 may contain one or more load/store pipelines for transferring data between GP registers 220 or registers 231 on the one hand and some form of memory (generally L1 Cache or L2 Cache) on the other. Additional pipelines, such as an instruction fetch and decode pipeline, may also exist within processor core 114. In addition to components shown in FIG. 2, processor core 114 may include additional special purpose registers and counters, load and store hardware for fetching data from or storing it to cache or memory, control hardware, and so forth.

The dot product unit 240 may be configured to perform one or more operations associated with computing a dot product of two vectors. A dot product operation produces a scalar value that is independent of the coordinate system and represents an inner product of the Euclidean space. The equation below describes a dot product operation performed between the previously described vectors A and B, wherein vector A may be represented by coordinates $[x_a, y_a, z_a]$, and vector B may be represented by coordinates $[x_b, y_b, z_b]$:

$$A \cdot B = x_a \cdot x_b + y_a \cdot y_b + z_a \cdot z_b$$

In one embodiment of the invention, the products $x_a*x_b$, $y_a*y_b$, and $z_a*z_b$ may be computed in the parallel pipelines of the vector unit. The dot product unit may compute the sum of the products $x_a*x_b$, $y_a*y_b$, and $z_a*z_b$ to generate the dot product.

Embodiments of the invention utilize adders in the vector unit and the dot product unit to compute a sum of more than two operands. For example, in one embodiment, a pair of operands may be added in each of the pipelines of a vector unit. A sum generated by each pipeline of the vector unit may be transferred to the dot product unit. The dot product unit may add each of the sums received from the vector unit to compute a sum of more than two operands. The components and structure of the vector unit and the dot product unit that facilitate the addition of more than two operands is described in greater detail below.

While various components of processor core 114 have been described and shown at a high level, it should be understood that the processor of the preferred embodiment contains many other components not shown, which are not essential to an understanding of the present invention. Furthermore, it will be understood that the processor core of FIG. 2 is simply one example of a processor architecture, and that many variations could exist in the number, type and arrangement of components within processor core 114, that components not shown may exist in addition to those depicted, and that not all components depicted might be present in a processor design. For example, the number and function of execution unit pipelines may vary; registers may be configured in different arrays and sets; dedicated floating point hardware may or may not be present; etc.

Figure 3:
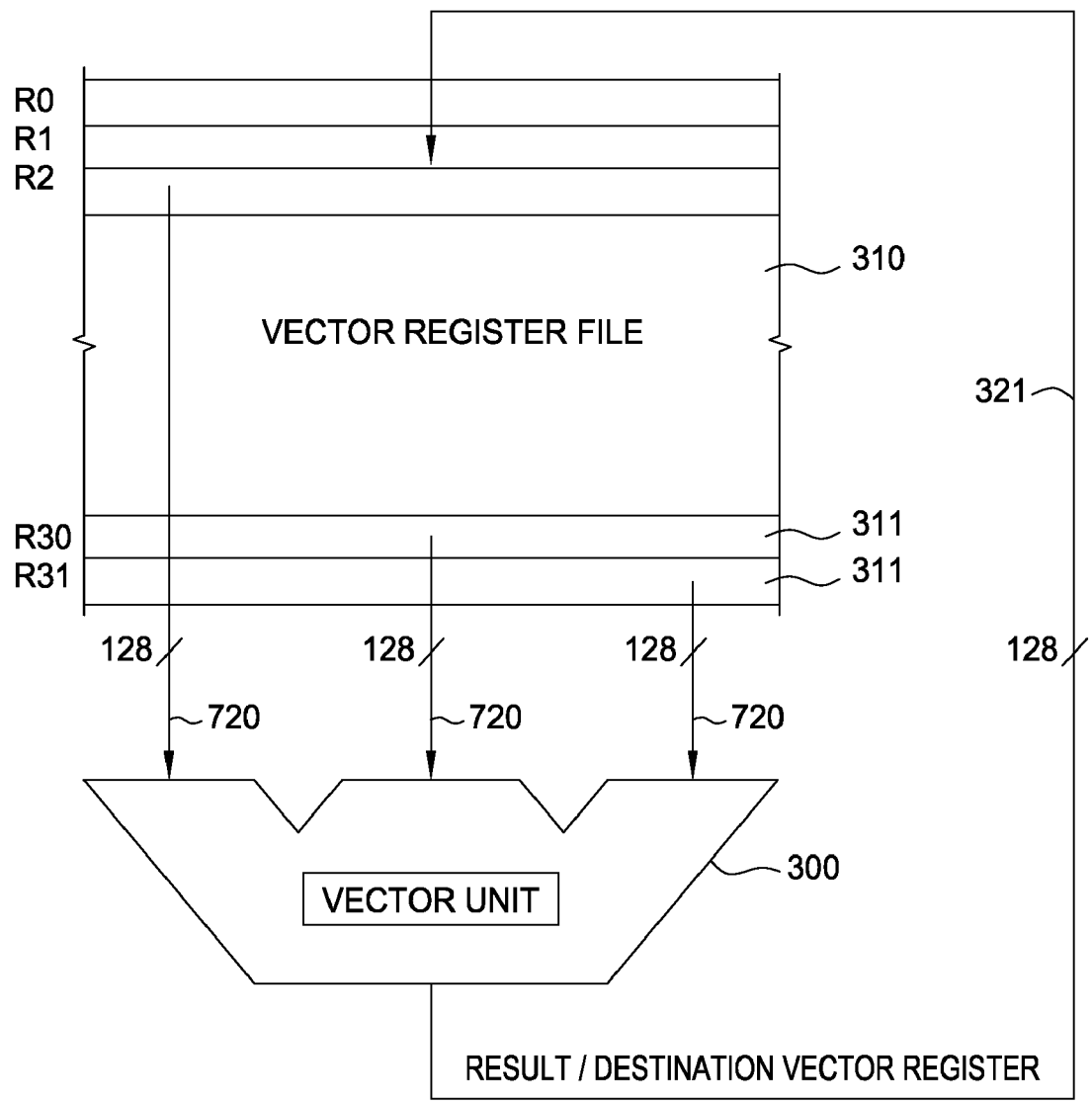
FIG. 3 illustrates an exemplary vector unit according to an embodiment of the invention.

FIG. 3 illustrates a more detailed view of an exemplary vector unit 300 and an associated register file 310. Vector unit 300 and register file 310 of FIG. 3 may correspond to the vector unit 230 and register file 231 of FIG. 2. Vector unit 300 may be configured to execute single instruction multiple data (SIMD) instructions. In other words, vector unit 300 may operate on one or more operands to produce a single scalar or vector result. For example, vector unit 300 may perform parallel operations on data elements that comprise one or more vectors or scalars to produce a scalar or vector result.

A plurality of operands operated on by the vector unit may be stored in register file 310. For example, in FIG. 3, register file 310 provides 32 128-bit registers 311 (R0-R31). In one embodiment, registers 311 may include vector data, for example, vector coordinates, pixel data, transparency, and the like. However, registers 311 may also be configured to store scalar data. Data may be exchanged between register file 310 and memory, for example, cache memory, using load and store instructions. Accordingly, register file 310 may be communicably coupled with a memory device, for example, a Dynamic Random Access memory (DRAM) device and or a cache (SRAM) device.

A plurality of lanes 320 may connect register file 310 to vector unit 300. Each lane may be configured to provide input from a register file to the vector unit. For example, in FIG. 3, three 128 bit lanes connect the register file to the vector unit 700. In this manner, the contents of any 3 registers from register file 310 may be provided to the vector unit at a time.

The results of an operation performed by the vector unit 300 may be written back to register file 310. For example, a 128 bit lane 321 provides a write back path to write results computed by vector unit 300 back to any one of the registers 311 of register file 310.

Figures 4, 6A, 7A:
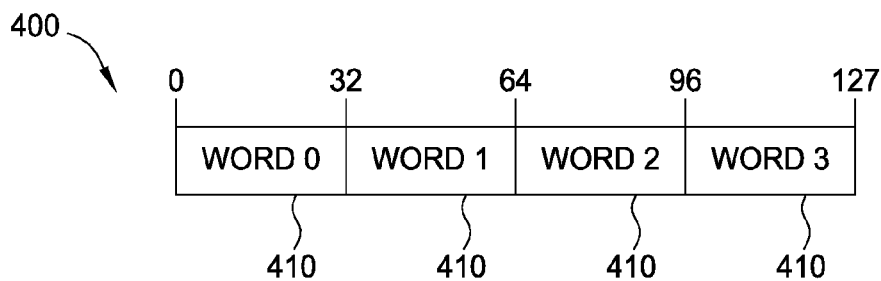
FIG. 4 illustrates an exemplary register according to an embodiment of the invention.
FIG. 6A illustrates exemplary code for computing the sum of more than two operands according to the prior art.
FIG. 7A illustrates another exemplary code segment for computing the sum of more than two operands according to the prior art.

Each of registers 311 may be configured to store a plurality of operands. FIG. 4 illustrates the structure of an exemplary register 400 comprising one or more operands. Register 400 may correspond to a register 311 illustrated in FIG. 3. As illustrated in FIG. 4, register 400 comprises a plurality of sections 410, wherein each section comprises a vector or scalar operand.

In one embodiment, register 400 may be a 128 bit register. Register 400 may be divided into four 32 bit word sections: WORD 0, WORD 1, WORD 2, and WORD 3, as illustrated. WORD 0 may include bits 0-31, WORD 1 may include bits 32-63, WORD 2 may include bits 64-97, and WORD 3 may include bits 98-127, as illustrated. However, one skilled in the art will recognize that register 400 may be of any reasonable length and may include any number of sections of any reasonable length.

Figure 5:
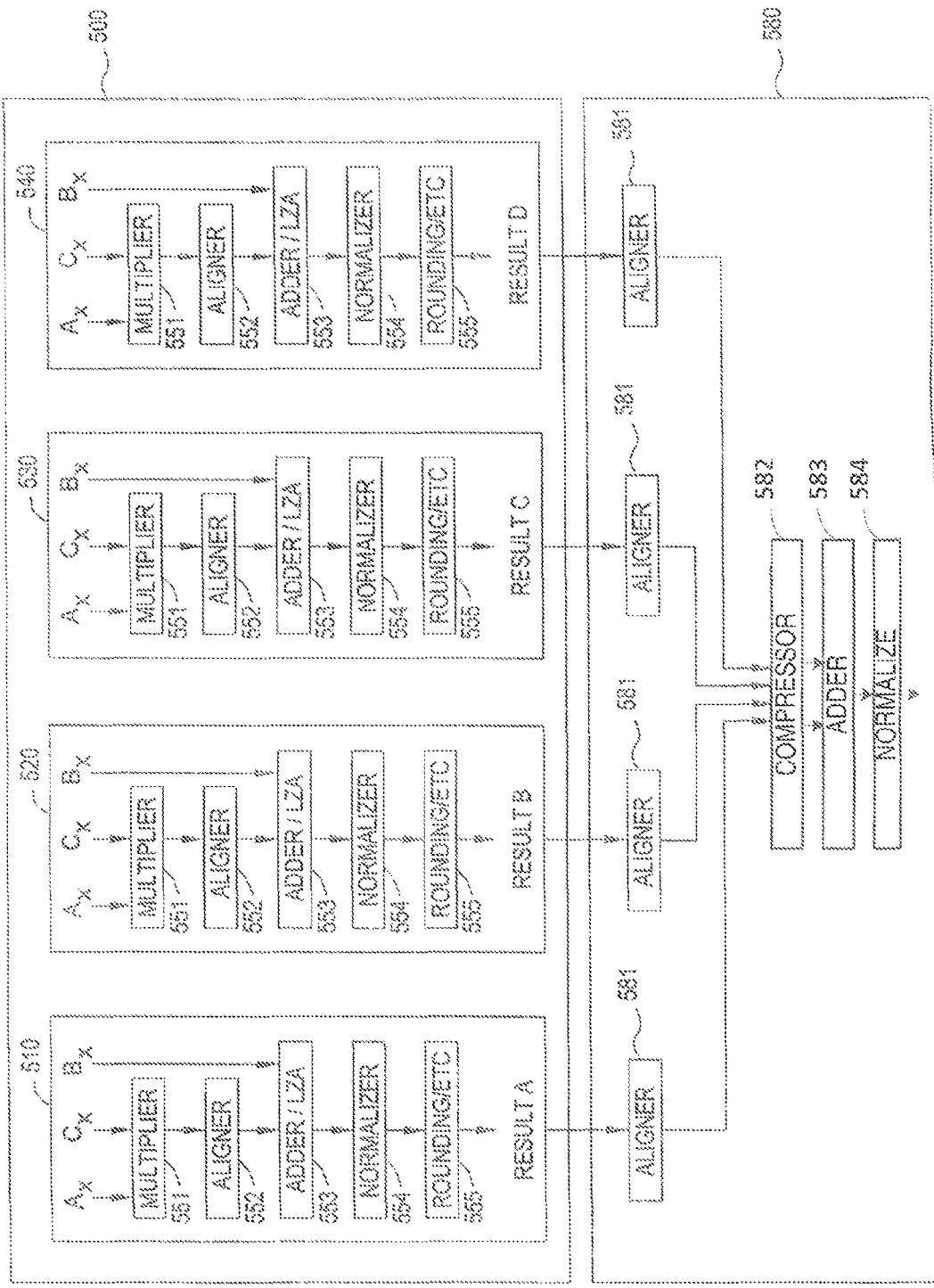
FIG. 5 illustrates components of an exemplary vector unit according to an embodiment of the invention.

FIG. 5 illustrates a more detailed view of the components of a vector unit 500. Vector unit 500 is an embodiment of the vector unit 300 depicted in FIG. 3. As illustrated in FIG. 5, vector unit 500 may include a plurality of processing lanes. For example, four processing lanes 510, 520, 530 and 540 are shown in FIG. 5. Each processing lane may be configured to perform an operation in parallel with one or more other processing lanes. For example, each processing lane may add a pair of operands. By adding different pairs of operands in different processing lanes of the vector unit, addition of more than two operands may be performed faster and more efficiently.

Each processing lane may be pipelined to improve performance. Accordingly, each processing lane may include a plurality of pipeline stages, with each stage performing one or more operations on the operands. For example, each vector lane may include a multiplier 551 for multiplying a pair of operands $A_x$ and $C_x$. Operands $A_x$ and $C_x$ may be derived from one of the lanes coupling the register file with the vector unit, for example, lanes 320 in FIG. 3. In one embodiment of the invention, the multiplication of operands may be performed in a first stage of the pipeline.

Each processing lane may also include an aligner 552 for aligning the product computed by multiplier 551. For example, an aligner 552 may be provided in each processing lane. Aligner 552 may be configured to adjust a decimal point of the product computed by a multiplier 551 to a desirable location in the result. For example, aligner 552 may be configured to shift the bits of the product computed multiplier 551 by one or more locations, thereby putting the product in desired format. While alignment is shown as a separate pipeline stage in FIG. 5, one skilled in the art will recognize that the multiplication and alignment may be performed in the same pipeline stage.

Each processing lane may also include an adder 553 for adding two operands. In one embodiment (illustrated in FIG. 5), each adder 553 may be configured to receive the product computed by a multiplier, and add the product to another operand $B_x$. Operand $B_x$, like operands $A_x$ and $C_x$, may be derived from one of the lanes connecting the register file to the vector unit. In some embodiments, one of the operands $A_x$ and $C_x$ may be directly provided to the adder 553. Therefore, each adder 553 may be configured to compute a sum of two operands received from the register file. Therefore, a plurality of add operations may be performed simultaneously in parallel in each of the processing lanes.

Each vector processing lane may also include a normalizing stage and a rounding stage, as illustrated in FIG. 5. Accordingly, a normalizer 554 may be provided in each processing lane. Normalizer 554 may be configured to represent a computed value in a convenient exponential format. For example, normalizer may receive the value 0.0000063 as a result of an operation. Normalizer 554 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 552 may be configured to align operand $B_x$, a product computed by the multiplier, or both. Furthermore, embodiments of the invention are not limited to the particular components described in FIG. 5. Any combination of the illustrated components and additional components such as, but not limited to, leading zero adders, dividers, etc. may be included in each processing lane.

In one embodiment of the invention, vector unit 500 may be configured to execute both vector and scalar instructions. For example, in a particular embodiment, vector unit 500 may include four processing lanes, wherein three processing lanes are used to perform vector operations and one processing lane is configured to perform scalar operations. For example lanes 510-530 may be used to execute vector instructions and lane 540 may be used to execute scalar instructions. In some embodiments, each vector processing lane may be configured to perform both vector and scalar operations.

Embodiments of the invention provide a new multiple addend instruction, wherein processing the multiple addend instruction comprises adding a pair of operands associated with the multiple addend instruction in each of the processing lanes of the vector unit in parallel, thereby increasing the efficiency of computing a sum a more than two operands. For example, in one embodiment, the multiple addend instruction may cause the contents of two registers A and B to be added to each other. Registers A and B may be similar to register 400 shown in FIG. 4, and may each contain a plurality of operands. Specifically, register A may contain 4 operands, Ax, Ay, Az, Aw. Register B may contain operands Bx, By, Bz, and Bw. The multiple addend instruction may cause a pair of operands to be added in each vector processing lane. For example, the sum Ax+Bx may be computed in vector processing lane 510, the sum Ay+By may be computed in vector processing lane 520, the sum Az+Bz may be computed in vector processing lane 530, and the sum Aw+Bw may be computed in vector processing lane 540.

In one embodiment, the sums produced by each vector unit processing lane may be added to each other in a dot product unit to calculate a sum of more than two operands. For example, FIG. 5 illustrates an exemplary dot product unit 580, according to an embodiment of the invention. Dot product unit 580 may correspond to the dot product unit 240 illustrated in FIG. 2. As illustrated in FIG. 5, dot product unit 580 may include a plurality of aligners 581. Each aligner 581 may receive, as an input, the output of an associated vector unit processing lane, as illustrated in FIG. 5. In one embodiment of the invention, the input received by each aligner 581 may be the sum of a pair of operands computed by each vector processing lane of vector unit 500. Aligner 581 may be similar to the aligner 552 and may be configured to shift the bits of an input by one or more locations, thereby putting the input in desired format.

The aligned and compressed inputs from the vector unit may be added by an adder 583 of the dot product unit 580. Adder 583 may be similar to the adder 553 and may compute a sum of the inputs received from the compressor 582. In one embodiment of the invention, adder 583 may include a compressor, for example a 4:2 compressor. A 4:2 compressor may receive 4 input addends, and outputs 2 addends (sum/carry). Therefore, only a full add of only two addends is necessary.

The sum computed by the adder 583 may be normalized by a normalizer 584. Normalizer 584 may be similar to normalizer 554 and configured to represent a value computed by the adder 583 in a convenient exponential format. Therefore, embodiments of the invention permit the calculation of a sum of more than two operands with a single instruction.

While adding more than two operands is discussed herein, embodiments of the invention may also be configured to perform a combination of both addition and subtraction operations involving more than two operands using a single multiple operand instruction. For example, in one embodiment, the multiple operand instruction may compute a result of, for example, A+B+C+D−E−F−G+H. To perform a subtraction, the sign bits of one or more operands may be flipped. For example, in a particular embodiment, the two's complement of operands to be subtracted (E, F, and G in the above example) may be derived and sent to an adder to perform a subtraction. Because the operands to be subtracted are represented in two's complement form, an adder may simply add the operands including operands in two's complement form to obtain a result comprising addition and subtraction of operands.

Advantages of the Multiple Addend Instruction

One advantage of the multiple addend instruction described above is that the processor stall cycles associated with the computation of a sum of more than two operands in the prior art is avoided. FIG. 6A illustrates exemplary code for computing a sum of more than two operands using a scalar unit, according to the prior art. Specifically, FIG. 6A illustrates code for computing the sum of 8 operands A–H. Because prior art scalar units can only compute the sum of two operands at a time, a plurality of instructions must be issued, wherein each instruction computes the sum of two operands.

For example, instructions 601-604 compute the sum of operands A and B, C and D, E and F, and G and H, respectively. The sum of each pair of operands is stored in a respective temporary register T1-T4 respectively, as illustrated in FIG. 6A. The values stored in temporary registers T1-T4 may subsequently be added by instructions 605-607 respectively to compute the final sum. For example, instruction 605 adds the value stored in T1 and T2 and stores the new sum in T5. Instruction 606 adds the value stored in T3 and T4 and stores the new sum in T6. The values stored in T5 and T6 may be added by instruction 607, and the final sum may be stored in T7.

Because the instructions described in FIG. 6A may be executed in a pipelined manner, and because one or more instructions may depend on the results of an earlier instruction, stalling of the pipeline may be necessary before execution of a dependent instruction. For example, FIG. 6B illustrates stalling of a pipeline during execution of the instructions described in FIG. 6A. For the sake of simplicity a 4 cycle pipeline is assumed.

As illustrated in FIG. 6B, pipelined processing of instructions 601-604 begins with the processing of instruction 601 in cycle 1. Processing of each subsequent instruction begins in the cycle after the previous instruction. However, as illustrated in FIG. 6B, processing of instruction 605 is stalled by one clock cycle. Referring back to FIG. 6A, instruction 605 computes the sum AB+CD, wherein AB represents a previously computed sum of A and B (stored in T5), and CD represents the sum of C and D (to be stored in T6). While it may be desirable to begin processing of instruction 605 in clock cycle 5, the sum CD has not yet been computed and stored in T6 in clock cycle 5, as illustrated in FIG. 6B. Therefore, the processing of instruction 605 must be stalled for one clock cycle.

Similarly, processing of instruction 606 must be stalled until the completion of instruction 604 to obtain the sum GH, and instruction 607 must be stalled for three clock cycles for the completion of instruction 606 to obtain the sum EFGH, as illustrated in FIG. 6B. Accordingly, it may take 15 clock cycles to compute the sum of 8 operands in the embodiment illustrated in FIG. 6B, wherein the 15 clock cycles include 5 pipeline stall cycles.

An eight operand summation may also be performed with prior art vector instructions. FIG. 7A illustrates exemplary code for adding 8 operands using vector instructions. Instructions 701 and 702 in FIG. 7A may be configured to load four operands into a register T1 and T2 respectively. For example, instruction 701 may load operands A-D in register T1 and instruction 702 may load operands E-H in register T2. Registers T1 and T2 may be similar to register 400 illustrated in FIG. 4. Accordingly, in one embodiment, registers T1 and T2 may each contain four 32 bit words. One skilled in the art will recognize however that registers T1 and T2 may be of any reasonable size and may contain any number of words, halfwords, doublewords, etc.

Instructions 703 and 704 may compute a sum of the 8 operands contained in registers T1 and T2. For example, Instruction 703 may compute store a sum of operands A and E and store it in a first location of register TA, a sum of B and F and store it in a second location of register TA, a sum of C and G and store it in a third location of register TA, and a sum of D and H and store it in a fourth location of register TA. Instruction 704 may compute the sum of all values stored in register TA to compute the final sum of all eight operands A-H.

Figure 7B:
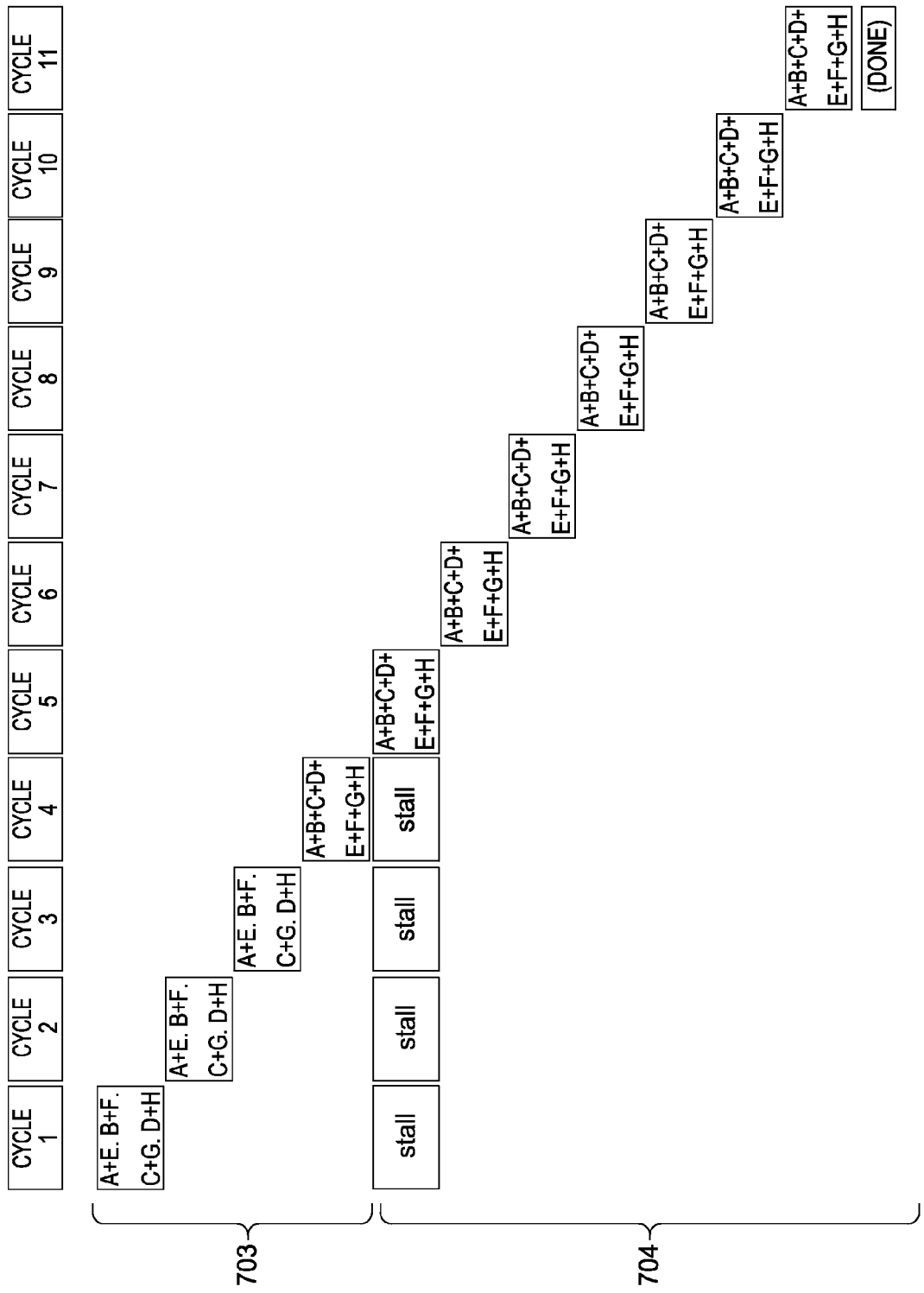
FIG. 7B illustrates an exemplary timing diagram for the instructions in FIG. 7A according to an embodiment of the invention.

FIG. 7B illustrates execution of instructions 703 and 704 in a pipeline. In one embodiment, execution of instruction 703 may require four clock cycles and the execution of instruction 704 may require 7 clock cycles. As illustrated in FIG. 7B, execution of instruction 704 may be stalled until cycle 5 to allow for the completion of instruction 703 on which instruction 704 depends. Accordingly, computing the sum of 8 operands requires 11 clock cycles using vector instructions.

As illustrated in FIGS. 6A, 6B, 7A, and 7B, computing a sum of eight operands requires numerous temporary registers and stalled clock cycles which may adversely affect the performance of the system. Embodiments of the invention obviate the problems associated with the prior art by providing a single multiple addend instruction capable of computing a sum of more than two operands. As discussed earlier, executing the instruction may involve computing a sum of a pair of operands in each processing lane of a vector unit, for example, processing lanes 510-540 illustrated in FIG. 5. The sums of the pairs added in each vector processing lane may be transferred to a dot product unit, wherein the sums are added to each other to generate a final sum of the more than two operands.

Figure 8:
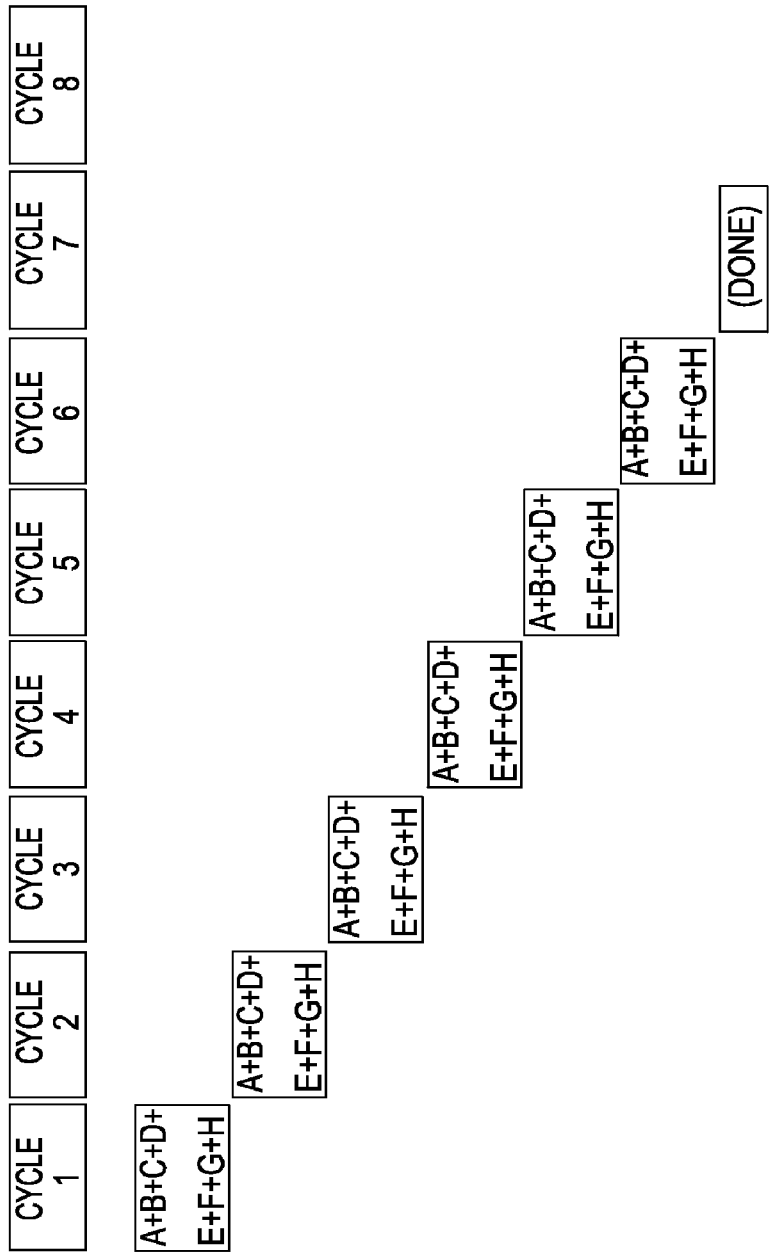
FIG. 8 illustrates a timing diagram for an exemplary multiple addend instruction according to an embodiment of the invention.

FIG. 8 illustrates execution of the multiple addend instruction in a pipeline. As illustrated in FIG. 8, execution of the multiple addend instruction requires only six clock cycles, which is a significant improvement over the embodiments illustrated in FIGS. 6B and 7B. The improvement in performance is achieved, in part, because a single instruction that computes a sum of more than two operands obviates stalling of the pipeline. Furthermore, the need for multiple temporary registers to store intermediate sums is also obviated.

The sum of more than two operands computed by the dot product unit may be stored back in the vector register file, for example, vector register file 310 of FIG. 3. In one embodiment of the invention, the multiple add instruction may include one or more masking bits to indicate a particular section or sections of a target register in which the sum of more than two operands should be stored.

CONCLUSION

By providing a single instruction for computing a sum of more than two operands, embodiments of the invention reduce the number of temporary registers and stall cycles required in computing the sum, thereby improving performance and allowing for efficient use of system resources.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
providing a computer processor comprising:
  a vector arithmetic unit comprising a plurality of processing lanes, each processing lane configured to, in parallel, perform one or more arithmetic operations on a predefined count of operands; and
  a dot product support unit comprising at least one aligner per processing lane, a compressor, and an adder;
wherein the computer processor is configured to perform a dot product operation by: by the dot product support unit, aligning and then summing products generated by the plurality of processing lanes of the vector arithmetic unit;
by the computer processor, receiving a single, predefined instruction for adding at most a predefined count of floating point addends, wherein the predefined count of floating point addends is equal to a product of: (i) a count of the plurality of processing lanes and (ii) the predefined count of operands;
wherein the plurality of processing lanes is fewer in number than the predefined count of floating point addends, wherein the predefined instruction is identifiable by an associated opcode; and
responsive to the predefined instruction for adding at most the predefined count of floating point addends, performing, by the vector arithmetic unit and the dot product support unit of the computer processor, a predefined operation to add the at most the predefined count of floating point addends using a single pass through the fewer processing lanes of the computer processor, wherein the predefined operation comprises:
  computing, in parallel, a first arithmetic result of adding a respective pair of floating point addends in each of one or more of a plurality of processing lanes of the vector arithmetic unit;
  transferring the first arithmetic result of each pair of floating point addends from the one or more processing lanes of the vector arithmetic unit to the dot product support unit;
  computing a second arithmetic result in the dot product support unit, the second arithmetic result being an arithmetic result of aligning, compressing, and adding each first arithmetic result received from the one or more processing lanes, to generate a normalized arithmetic result of adding at most the predefined count of floating point addends;
wherein the instruction is configured to designate one or more vector arithmetic units to perform vector operations and one or more vector arithmetic units to perform scalar operations; and
wherein the scalar operations are configured to perform a combination of both addition and subtraction operations.

2. The method of claim 1, wherein the at most the predefined count of floating point addends are received from one or more registers in a register file.

3. The method of claim 2, wherein each register in the register file comprises a plurality of operands.

4. The method of claim 3, wherein computing the first arithmetic result comprises computing an arithmetic result of a first floating point addend from a first register and a second floating point addend from a second register in a processing lane of the vector arithmetic unit.

5. The method of claim 1, wherein each processing lane of the vector arithmetic unit comprises an adder configured to calculate the first arithmetic result.

6. The method of claim 1, wherein each processing lane of the vector arithmetic unit comprises a multiplier, an aligner, and a normalizer.

7. A computer-implemented method for computing a sum of eight floating point addends, comprising:
providing a computer processor comprising:
  a vector arithmetic unit comprising four processing lanes, each processing lane configured to, in parallel, perform one or more arithmetic operations on two operands; and
  a dot product support unit comprising at least one aligner per processing lane, a compressor, and an adder configured in series to compute a sum of four operands;
wherein the computer processor is configured to perform a dot product operation by: by the dot product support unit, aligning and then summing products generated by the plurality of processing lanes of the vector arithmetic unit;
by the computer processor, receiving a single, predefined instruction for adding at most eight floating point addends, wherein the predefined instruction is identifiable by an associated opcode; and responsive to the predefined instruction for adding at most eight floating point addends, performing, by the vector arithmetic unit and the dot product support unit of the computer processor, a predefined operation to add the at most eight floating point addends using a single pass through the four processing lanes of the computer processor, wherein the predefined operation comprises:
  computing, in parallel, a sum of a respective pair of floating point addends in each of the four processing lanes of the vector arithmetic unit;
  transferring the sum of each pair of floating point addends from each processing lane of the vector arithmetic unit to the dot product support unit;
  aligning each of the sums of each pair of floating point addends from each processing lane of the vector arithmetic unit, compressing the aligned sums, and adding the compressed sums in the dot product support unit to generate a normalized sum of the eight floating point addends;
wherein the instruction is configured to designate one or more vector arithmetic units to perform vector operations and one or more vector arithmetic units to perform scalar operations; and
wherein the scalar operations are configured to perform a combination of both addition and subtraction operations.

8. The method of claim 7, wherein the eight floating point addends are received from one or more registers in a register file, each register in the register file comprising a plurality of operands.

9. The method of claim 8, wherein computing a sum of a pair of floating point addends comprises computing sum of a first floating point addend from a first register and a second floating point addend from a second register in a processing lane of the vector arithmetic unit.

10. The method of claim 8, wherein each processing lane of the vector arithmetic unit comprises an adder configured to calculate the first arithmetic result.

11. A system comprising a plurality of processors communicably coupled with one another, wherein each processor comprises:
A register file comprising a plurality of registers, each register comprising a plurality of operands;
a vector arithmetic unit comprising a plurality of vector processing lanes, wherein the vector processing lanes comprise at least an adder configured to, in parallel, calculate a sum of a pair of operands; and a dot product support unit comprising at least one aligner per processing lane, a compressor, and an adder configured in series to compute a sum of more than two operands;

wherein the computer processor is configured to perform a dot product operation by: by the dot product support unit, aligning and then summing products generated by the plurality of processing lanes of the vector arithmetic unit;

wherein the at least one processor is configured to:

receiving a single, predefined instruction for adding at most a predefined count of floating point addends, wherein the predefined count of floating point addends is equal to a product of: (i) a count of the plurality of processing lanes and (ii) the predefined count of operands;

wherein the plurality of processing lanes is fewer in number than the predefined count of floating point addends, wherein the predefined instruction is identifiable by an associated opcode; and responsive to the predefined instruction for adding at most the predefined count of floating point addends, perform, by the vector arithmetic unit and the dot product support unit of the at least one processor, a predefined operation to add the at most the predefined count of floating point addends using a single pass through the fewer processing lanes of the computer processor, wherein the predefined operation comprises:

computing, in parallel, a first arithmetic result of adding a respective pair of floating point addends received from the at least one register in each of one or more vector processing lanes of the vector arithmetic unit of the at least one processor;

receiving, by the dot product support unit of the at least one processor, the first arithmetic result from the one or more vector processing lanes of the vector arithmetic unit of the at least one processor;

computing, by the dot product support unit of the at least one processor, a second arithmetic result from aligning, compressing, and adding the first arithmetic results received from the one or more processing lanes, to compute a normalized arithmetic result of adding at most the predefined count of floating point addends;

wherein the instruction is configured to designate one or more vector arithmetic units to perform vector operations and one or more vector arithmetic units to perform scalar operations; and wherein the scalar operations are configured to perform a combination of both addition and subtraction operations.

12. The system of claim 11, wherein each register of the register file comprises four operands.

13. The system of claim 11, wherein the vector arithmetic unit is configured to compute the first arithmetic result by computing an arithmetic result of a first floating point addend from a first register and a second floating point addend from a second register in a processing lane of the vector arithmetic unit.

14. The system of claim 11, wherein each processing lane of the vector arithmetic unit comprises an adder configured to calculate the first arithmetic result.

15. The system of claim 11, wherein each processing lane of the vector arithmetic unit comprises a multiplier, an aligner, and a normalizer.

16. The method of claim 1, wherein at least a first processing lane of the vector arithmetic unit is configured to perform a scalar arithmetic operation in parallel with at least a second processing lane of the vector arithmetic unit performing a vector arithmetic operation;

wherein the products are generated by the plurality of processing lanes of the vector arithmetic unit without requiring any accumulator, wherein the products are aligned and then summed by the dot product support unit without requiring any accumulator, wherein an accumulator comprises a register for storing temporary results.

17. The method of claim 16, wherein the normalized arithmetic result is computed without incurring any pipeline stalls associated with issuing multiple instructions to add the predefined count of floating point addends;

wherein the floating point addends are stored contiguously in one or more registers of a register file of the computer processor via one or more permute instructions issued prior to the predefined scalar instruction, wherein the one or more registers of the register file need not be contiguous.

18. The method of claim 17, wherein the at most the predefined count of floating point addends is eight, wherein the count of the plurality of processing lanes of the vector arithmetic unit is four, wherein the predefined count of operands supported by each processing lane is two, and wherein the computer processor is configured to sum the eight floating point addends in a single pass through the four processing lanes of the vector arithmetic unit.

19. The method of claim 7, wherein at least a first processing lane of the vector arithmetic unit is configured to perform a scalar arithmetic operation in parallel with at least a second processing lane of the vector arithmetic unit performing a vector arithmetic operation;

wherein the products are generated by the plurality of processing lanes of the vector arithmetic unit without requiring any accumulator, wherein the products are aligned and then summed by the dot product support unit without requiring any accumulator, wherein an accumulator comprises a register for storing temporary results.

20. The method of claim 19, wherein the normalized arithmetic sum is computed without incurring any pipeline stalls associated with issuing multiple instructions to add the predefined count of floating point addends;

wherein the floating point addends are stored contiguously in one or more registers of a register file of the computer processor via one or more permute instructions issued prior to the predefined scalar instruction, wherein the one or more registers of the register file need not be contiguous.

21. The system of claim 11, wherein at least a first vector processing lane of the vector arithmetic unit is configured to perform a scalar arithmetic operation in parallel with at least a second vector processing lane of the vector arithmetic unit performing a vector arithmetic operation;

wherein the products are generated by the plurality of vector processing lanes of the vector arithmetic unit without requiring any accumulator, wherein the products are aligned and then summed by the dot product support unit without requiring any accumulator, wherein an accumulator comprises a register for storing temporary results.

22. The system of claim 21, wherein the normalized arithmetic result is computed without incurring any pipeline stalls associated with issuing multiple instructions to add the predefined count of floating point addends;
    wherein the floating point addends are stored contiguously in one or more registers of the register file via one or more permute instructions issued prior to the predefined scalar instruction, wherein the one or more registers of the register file need not be contiguous.

23. The system of claim 22, wherein the at most the predefined count of floating point addends is eight, wherein the count of the plurality of vector processing lanes of the vector arithmetic unit is four, wherein the predefined count of operands supported by each vector processing lane is two, and wherein the processor is configured to sum the eight floating point addends in a single pass through the four vector processing lanes of the vector arithmetic unit.

\* \* \* \* \*